United States Patent [19]
Szajak et al.

[11] Patent Number: 5,858,420
[45] Date of Patent: Jan. 12, 1999

[54] FLOW REGULATING AND DISTRIBUTING ASSEMBLY

[75] Inventors: Jerzy Szajak, Toronto; John R. Galt, Nobleton; Hans B. Luedke, Toronto; Martin R. Kestle, Everett; Uwe Klaus Melisch, Bolton, all of Canada

[73] Assignee: Husky Injection Molding Systems Ltd.

[21] Appl. No.: 910,394

[22] Filed: Aug. 13, 1997

[51] Int. Cl.⁶ .................................................. B29C 45/02
[52] U.S. Cl. ........................................ 425/557; 425/560
[58] Field of Search ................................ 425/557, 558, 425/559, 560, 561

[56] References Cited

U.S. PATENT DOCUMENTS

| | | | |
|---|---|---|---|
| 4,717,324 | 1/1988 | Schad et al. | 425/562 |
| 5,380,186 | 1/1995 | Hettinga et al. | 425/557 |
| 5,380,187 | 1/1995 | Fujikawa | 425/568 |
| 5,616,350 | 4/1997 | Wissmann et al. | 425/463 |

*Primary Examiner*—Tim Heitbrink
*Attorney, Agent, or Firm*—Arne I. Fors; Robert P. Stratton

[57] ABSTRACT

A pre-plasticizing injection molding machine includes a plasticizing and flow regulating assembly connected to the tip of an injection chamber or shooting pot having an injection cylinder. A distributor valve allows the transfer of plastic resin into the shooting pot at low pressure and prevents the backward flow of resin to the plasticizing unit when the injection plunger injects the resin. A plurality of distribution channels in communication with either the distributor valve or a separate valve, and having outlets in the shooting pot angularly equispaced in proximity to the perimeter of the conical tip of the plunger uniformly distributes new resin behind resin retained in the shooting pot from the previous injection cycle, thereby obviating stagnation zones.

14 Claims, 7 Drawing Sheets

FLOW REGULATING AND DISTRIBUTING ASSEMBLY

BACKGROUND OF THE INVENTION (i) Field of the Invention

The present invention relates to a pre-plasticizing injection molding machine with a plasticizing component provided separately from an injection component and, more particularly, relates to the provision of additional melt channels and redesigned shooting pot head for minimizing material retention and stagnation in the shooting pot.

(ii) Description of the Related Art

A conventional two stage or pre-plasticizing injection molding machine comprises, in general, a plasticizing component having a screw in a heated barrel and an injection component having an injection plunger. Polymer resin plasticized in the plasticizing component is transferred to the injection component's chamber, or shooting pot, by way of a feed channel and is injected into the mold cavity through a nozzle from the injection plunger. Conventionally, a distributor or ball check valve in the feed channel prevents resin in the shooting pot from flowing backward to the plasticizing component when the injection plunger injects the resin.

In that the pre-plasticizing injection molding machine is equipped with an independent plasticizing component, it has more plasticizing capability than an in-line or reciprocating screw type injection molding machine. However, the ball check valve often causes resin retention and stagnation in the shooting pot, and such resin is prone to thermal degradation. For polyethylene teraphthalate (PET) resins, increased residence time in the shooting pot leads to higher levels of acid aldehyde (AA), an unacceptable by-product of the manufacturing process.

It is also necessary to completely purge any remaining resin in the shooting pot prior to changing resin material and/or color. If a small residual portion of resin remains in the shooting pot, purging must be repeatedly carried out until the residue is removed. This leads to more scrap waste and to delays in the manufacturing process.

Several techniques have been developed in an effort to expedite changes in resin material and/or color and to minimize down time and scrap waste.

U.S. Pat. No. 5,380,186 issued Jan. 10, 1995 discloses a flow regulating assembly for an in-line or reciprocating screw plastic injection molding machine in which plastic flow from a central chamber in an injection piston is directed towards the perimeter of the injection piston adjacent the wall of the accumulator cavity, thereby scouring and displacing stagnant plastic material otherwise collecting in corners.

U.S. Pat. No. 5,380,187 issued Jan. 10, 1995 discloses a nozzle adapter for a pre-plasticizing injection molding machine comprising an injection by-pass from the perimeter of the injection chamber to the injector nozzle for discharging resin from the previous injection to the injector nozzle. This design eliminates a key advantage of a pre-plasticizing machine, namely the ability to continue plasticizing melt during injection, because the screw must be held forward during filling of the shooting pot, injecting and holding (clamping) to prevent backflow of resin. Furthermore, the infeed channels are smaller in diameter than the outflow channel to the injection nozzle, resulting in slower filling times. Both factors impose a significant cycle time penalty.

U.S. Pat. No. 5,616,350 issued Apr. 1, 1997 discloses a dual flow divider for use on an extruder for balancing feed to two or more extrusion dies and for streamlining resin flow to avoid hot spots and stagnation.

It is an object of the present invention to provide a pre-plasticizing injection molding machine that minimizes resin retention and stagnation in the shooting pot.

SUMMARY OF THE INVENTION

The present invention is related to a pre-plasticizing injection molding machine equipped with a plasticizing part for plasticizing synthetic resin material by turning a screw in a heated barrel and an injection part for injecting plasticized resin material through a nozzle by advancing and retracting an injection plunger into and from an injection cylinder. The tip of the plasticizing chamber, consisting of the heated barrel, is connected to the tip of an injection chamber or shooting pot, consisting of the injection cylinder, with a single channel. The channel is closed with a ball check valve at the time of injection. A portion of this same channel is used to inject plastic into the mold through the distributor and shooting pot head.

The present invention is characterized in that separate channels are used for the transfer of resin and the injection of resin. Transfer of resin is brought into the shooting pot head behind resin retained from previous shots by the use of at least two channels, and preferably four channels, communicating with the periphery of the conical seat of the shooting pot plunger head. The melt is therefore distributed more uniformly into the shooting pot. During injection, resin retained from the last cycle is injected first through the separate injection channel. This process is repeated in every cycle, so resin is not retained in the shooting pot for long periods of time.

In its broad aspect, the flow regulating and distributing assembly of the invention for controlling the flow of plastic material into the accumulator of an injection molding machine from a plasticizing chamber and for controlling the discharge of plastic material from the accumulator cavity to an injection nozzle, said injection molding machine having a shooting pot head with a conical seat connected to the accumulator, and said shooting pot head having a central injection channel coaxial with the conical seat communicating the accumulator with the injection nozzle, comprises a first channel therein for connecting the shooting pot head injection channel with the injection nozzle and a second channel for connecting the plasticizing chamber with the shooting pot head, said second channel having a plurality of branch channels having outlets in the conical seat in proximity to the periphery of the conical seat operative to feed plastic material to the shooting pot head in proximity to the shooting pot head periphery, and valve means operative to feed plastic material to the shooting pot head through the second channel while closing the first channel and to discharge plastic material from the shooting pot head to the injection nozzle through the first channel while closing the second channel. More particularly, said shooting pot head may have four branch channels in communication with the second channel formed therein, said branch channels having wall openings angularly equispaced about the conical seat in proximity to the periphery of the conical seat, a pair of branch channels straddling the first channel above and below the first channel, said branch channels having wall openings in the conical seat above and below the first channel in proximity to the periphery of the conical seat, or a pair of branch channels straddling the first channel at each side of the first channel, said branch channels having wall openings in the conical seat at each side of the first channel in proximity to the periphery of the conical seat.

The valve means comprises either an axially reciprocal spool valve having one or more axially spaced-apart diametric passages formed therein for communication with either the first or second channels by selective axial movement of the valve, or a rotary valve having one or more diametric passages for communication with either the first or second channels by selective rotary movement of the valve. In the embodiment of the invention wherein said first channel and said second channel intersect, said valve means preferably are mounted at the intersection of the first and second channels for rotary or axially reciprocal movement.

In a further aspect of the invention in which the flow regulating and distributing assembly is incorporated in an injection mold, the injection mold comprises a first channel formed therein for connecting the shooting pot head injection channel with the injection nozzle and a second channel for connecting the melt channel with the shooting pot head conical seat in proximity to the periphery of the conical seat, and first and second valve means, said first valve means operative to feed plastic material to the shooting pot head through the second channel while the second valve means are closed, and said second valve means operative to discharge plastic material from the shooting pot head to the injection nozzle passage through the first channel while the first valve means are closed.

In a still further aspect of the invention, the flow regulating and distributing assembly additionally comprises a shooting pot plunger having a conical tip adapted to mate with the conical seat, said conical tip having an annular concave recess opposed to the periphery of the conical seat. The conical tip may have a plurality of equispaced flat planes about the perimeter thereof intersecting the annular concave recess to form annular concave segments.

BRIEF DESCRIPTION OF THE DRAWINGS

A detailed description of the preferred embodiments of the invention follows, with reference to the accompanying drawings, wherein.

DESCRIPTION OF THE PREFERRED EMBODIMENTS

Figure 1:
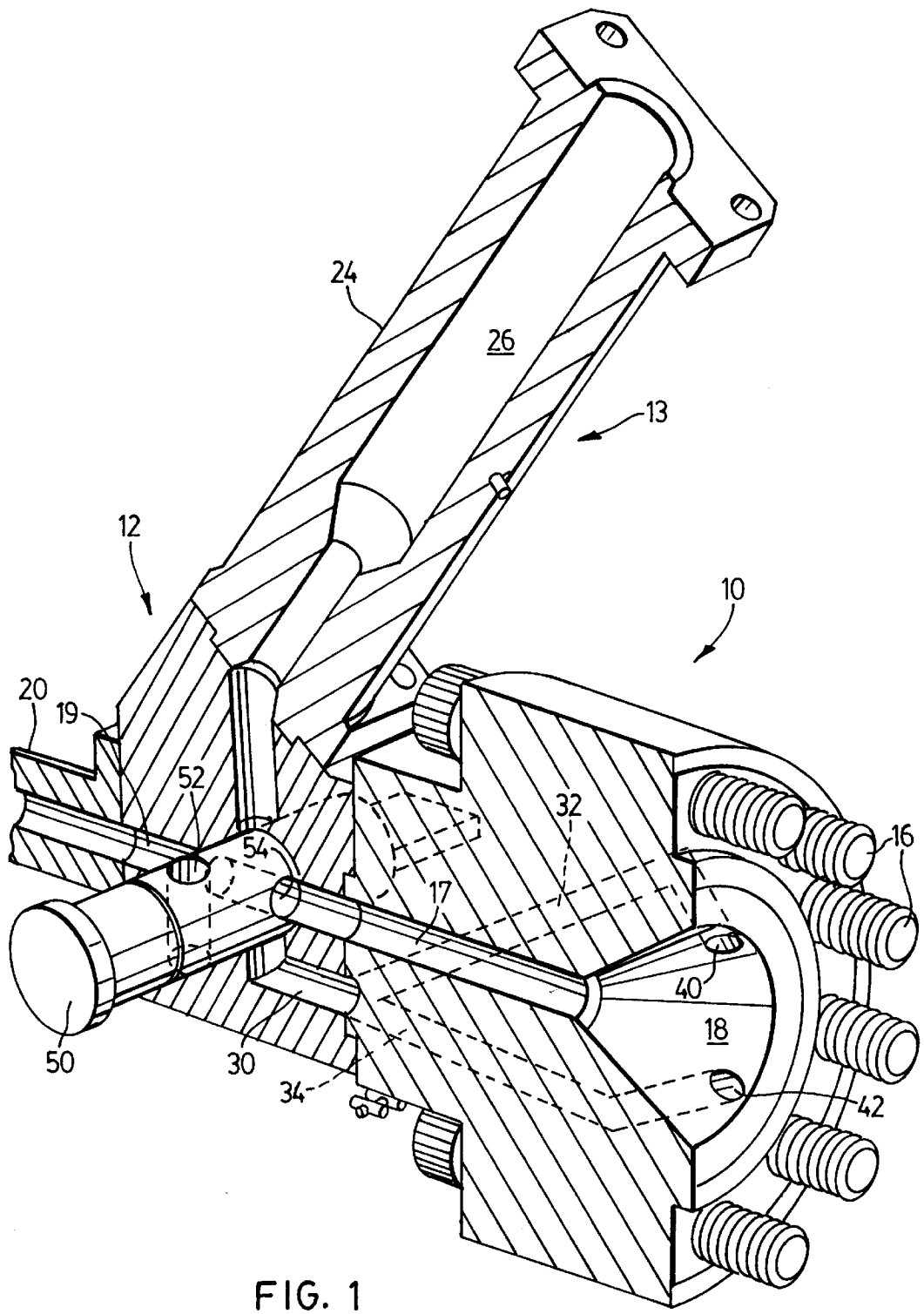
FIG. 1 is a perspective view, partly in section, of an injection unit of an injection molding machine according to the present invention.

With reference first to FIGS. 1–6, the shooting pot head 10 and the flow regulating assembly 12 of the invention with a portion of plasticizing unit 13 are illustrated. Shooting pot head 10 is removably secured to the forward end of cylindrical injection barrel 14, having an accumulator cavity or pot 15, as shown in FIGS. 2, 3, 5 and 6, by a plurality of angularly equispaced threaded bolts 16. Shooting pot head 10 has a conical seat 18 for receiving the mating conical head or plunger tip of an injection plunger 22, for injecting plastic material contained in accumulator cavity 15 under pressure forwardly through injection channel 17 and channel 19 in flow regulating assembly 12 into injection nozzle unit 20.

Flow regulating assembly 12 has the heated barrel 24 of plasticizing unit 13 attached thereto for introducing molten plastic resin contained in barrel head or chamber 26 through channels 28, 30 and at least two, preferably four, branch channels 32, 34, 36 and 38 (FIG. 4) which lead from channel 30 to angularly equispaced outlets, i.e. wall openings 40, 42, 44 and 48 respectively in conical seat 18 of the shooting pot 10 in proximity to the periphery of seat 18.

Figure 2:
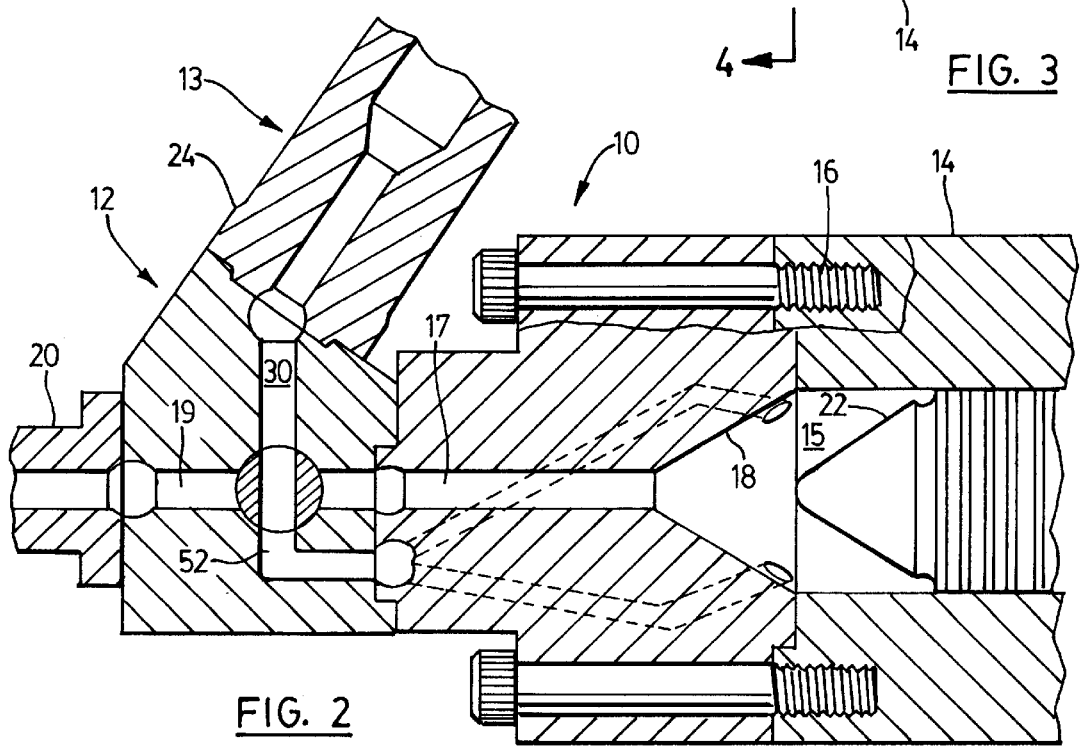
FIG. 2 is a longitudinal sectional view of a shooting pot and a nozzle with a portion of an accumulator and an axial valve in an operative position for flow of resin into the perimeter of the shooting pot plunger head during loading of the shooting pot.
Figure 4:
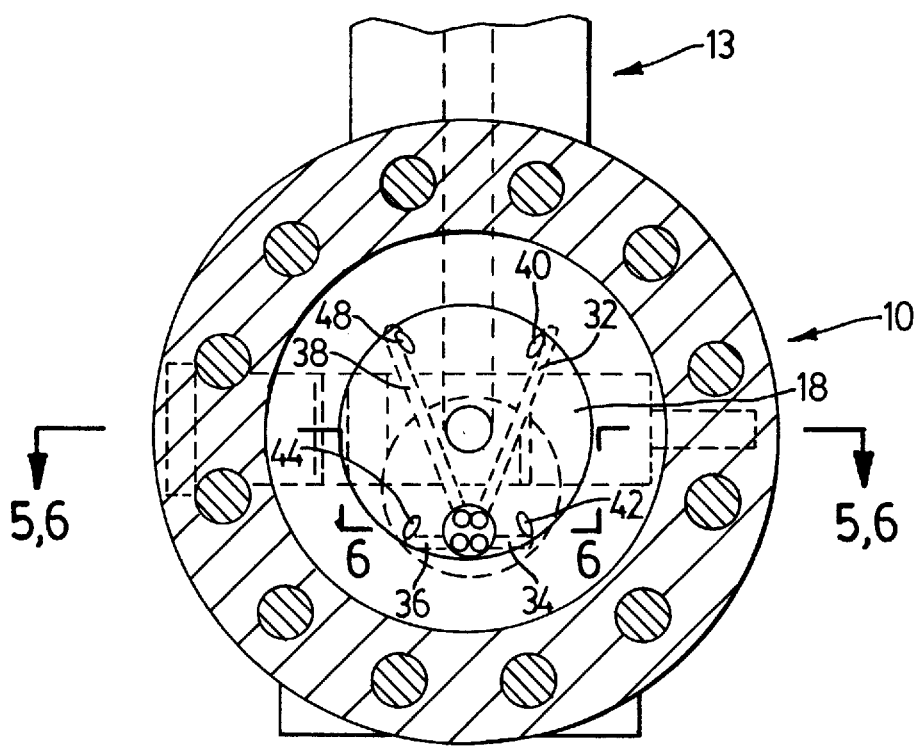
FIG. 4 is a transverse section along the line 4—4 of FIG. 2 illustrating the arrangement of feed flow channels to the perimeter of the shooting pot plunger head.
Figure 5:
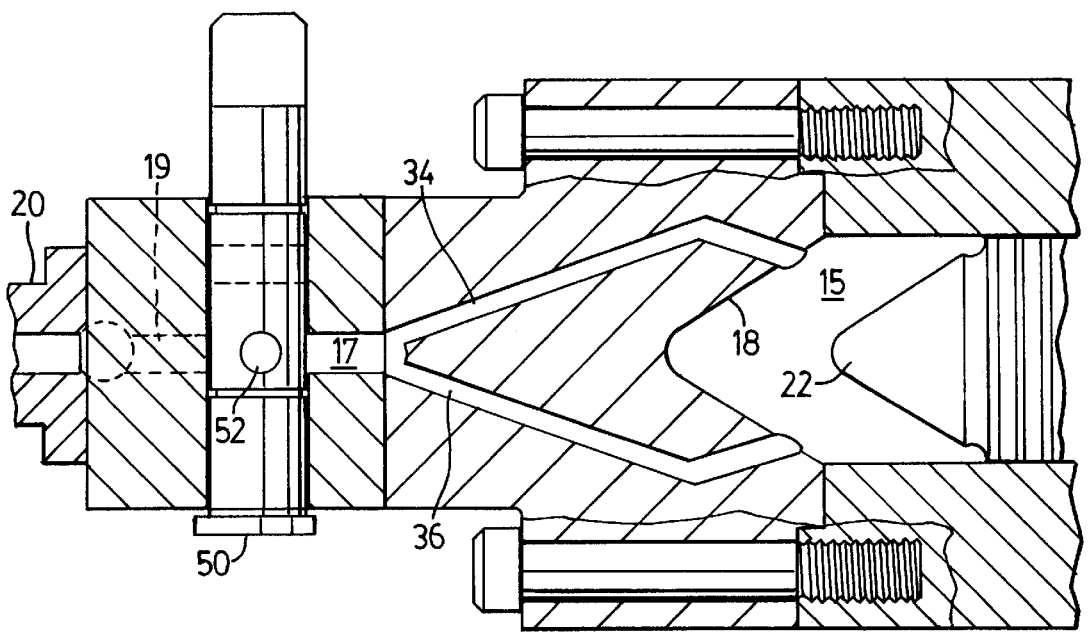
FIG. 5 is a horizontal, longitudinal sectional view taken along the lines 5—5 of FIG. 4 with the axial valve in the loading position shown in FIG. 3.

Valve 50 is an axially reciprocal spool type with a diametric passage 52 adapted to be aligned with the vertical component of channel 30 when valve 50 is extended into regulating assembly 12, by means well known in the art, to the position shown in FIGS. 2 and 5 to allow heated resin to flow into the accumulating cavity 15 of shooting pot 10 in proximity to and uniformly distributed about the periphery of conical seat 18 upon retraction of the injection piston.

Figure 3:
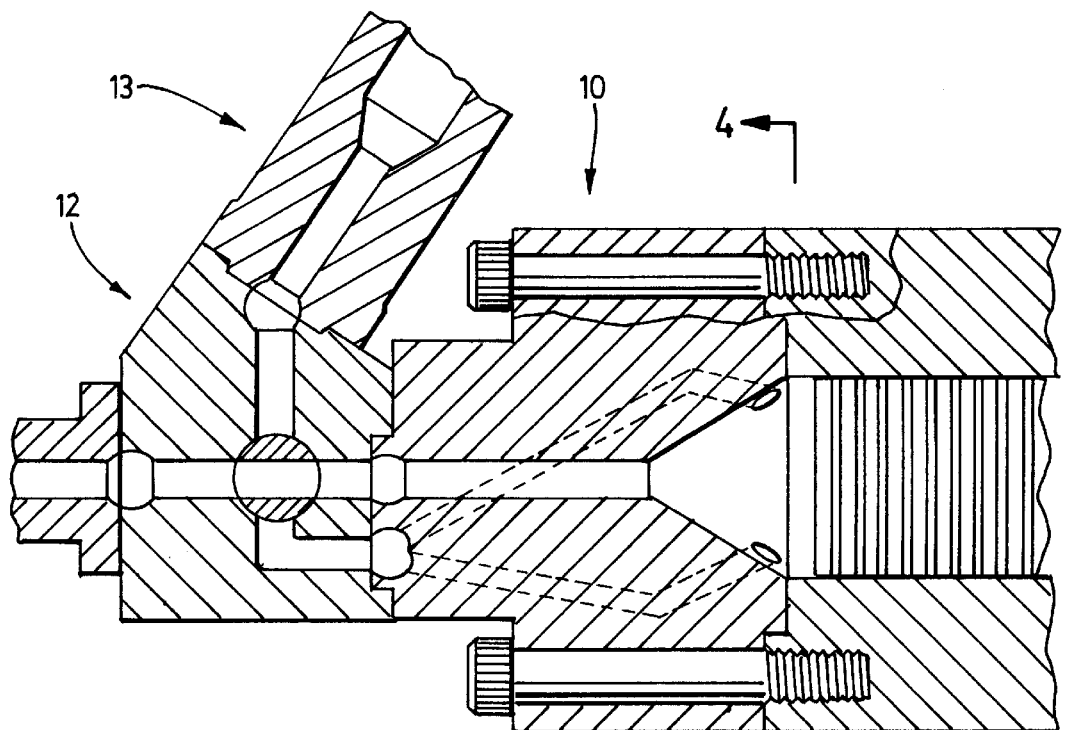
FIG. 3 is a longitudinal sectional view corresponding to FIG. 2 with the axial valve in an operative position for discharge of resin into the nozzle and into a mold.
Figure 6:
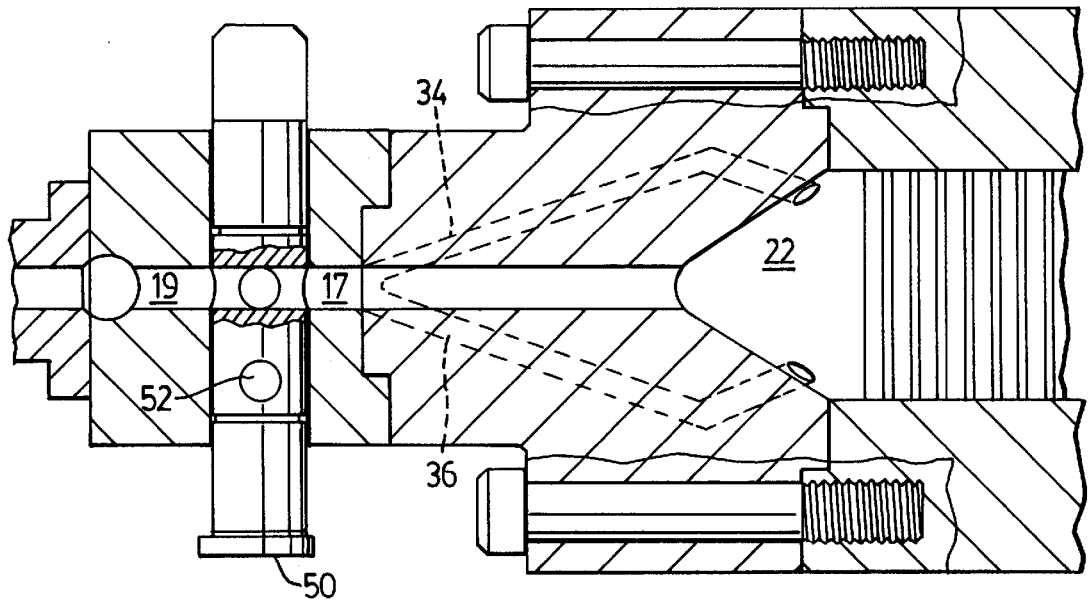
FIG. 6 is a horizontal, longitudinal sectional view taken along the line 6—6 of FIG. 4 with the axial valve in the discharge position shown in FIG. 2.

Upon completion of transfer of a desired quantity of resin for loading shooting pot 10, valve 50 is retracted from regulatory assembly 12 to the position shown in FIGS. 1, 3 and 6 for alignment of diametric passage 54 with channels 17 and 19 and transfer of a predetermined quantity resin through channels 17 and 19 into nozzle unit 20 by actuation of injector plunger 22 forwardly against conical seat 18.

Valve 50 could also be a rotary valve having one diametric passage such as passage 52 which can be aligned with either first or second channel 17 or 30, respectively, by rotation thereof.

The present invention has the important advantage of obviating a stagnation zone in the shooting pot by providing fresh resin to the accumulator cavity 15 at the rear of resin retained from the previous injection cycle, whereby the retained resin is first injected through the injection channel during the next injection cycle. Old resin material thus is completely expelled from the shooting pot within a few cycles, allowing for quick change of color and material.

Although the description has proceeded with the flow regulating and distributing assembly and the shooting pot contained in separate units, it will be understood that the distributor valve and related channels with shooting pot can be incorporated in the associated molds. Such an arrangement allows precise metering of molten plastic to the mold cavities on an individual basis.

Figure 7:
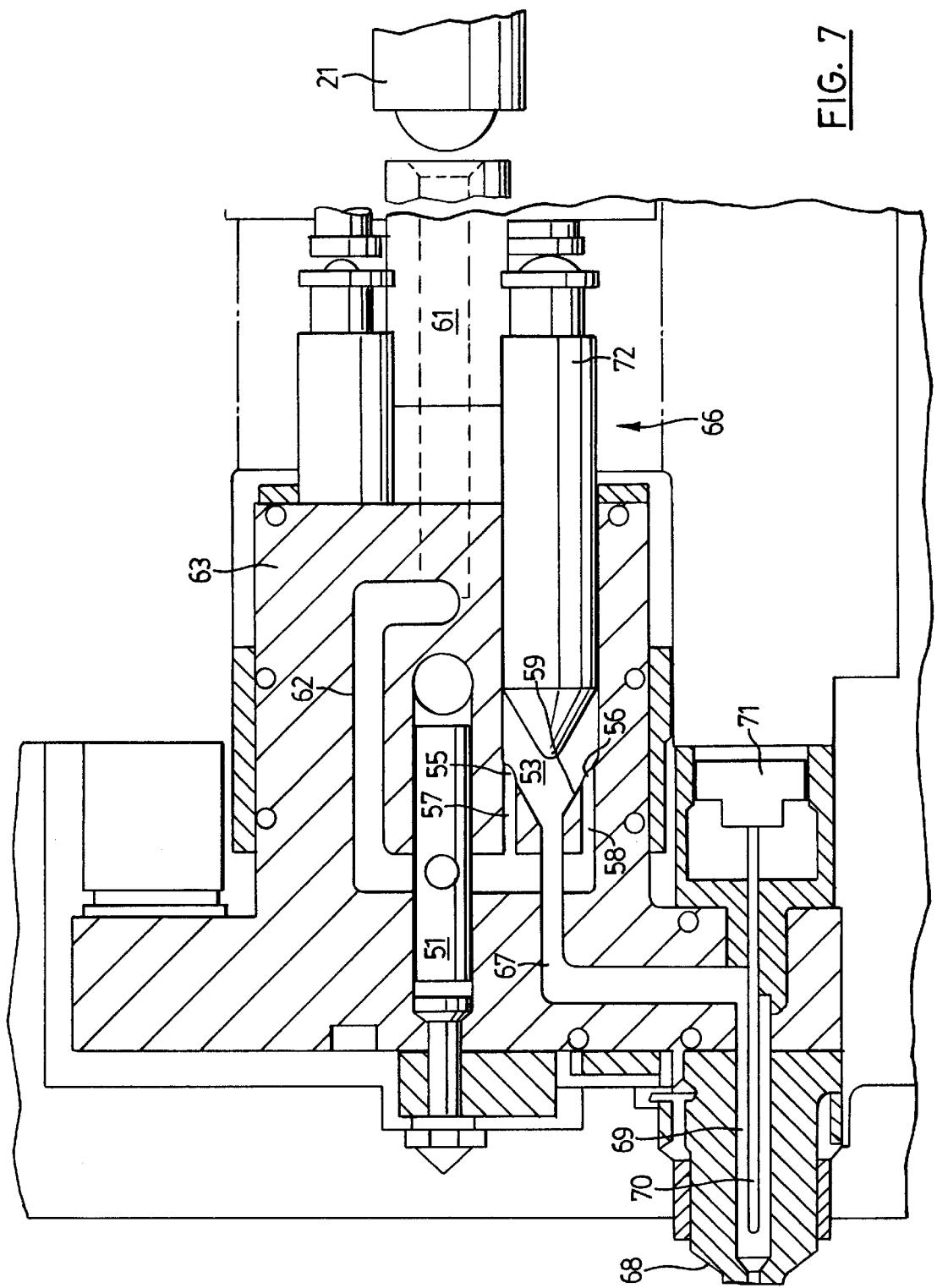
FIG. 7 is a sectional view of a portion of a mold showing a shooting pot within a hot runner system.

Referring to FIG. 7, the nozzle 21 feeds molten plastic through channels 61 and 62 of the hot runner manifold block 63 and through rotary or axially reciprocal valve 51 to fill the accumulator cavity 53 of shooting pot 66 via diametrically opposed upper and lower wall openings 55, 56 of branch passages 57, 58 in the conical seat 59 in proximity to the periphery thereof. When the desired amount of molten plastic is charged to the shooting pot 53 and the shooting pot is filled, valve 51 is closed to channel 62, as depicted in FIG. 7, and plastic in the precise quantity desired is metered to the mold cavity (not shown) via channels 67 and 69 and nozzle 68. Nozzle stem 70, shown in the retracted position in FIG. 7, is operated by piston 71 to open or close the nozzle passage. Molten plastic is fed from the shooting pot until the tip of the shooting pot plunger 72 advances to conical seat 59 of shooting pot 53. Valve stem 70 is then closed, the molded product removed, and the cycle repeated.

Figure 8:
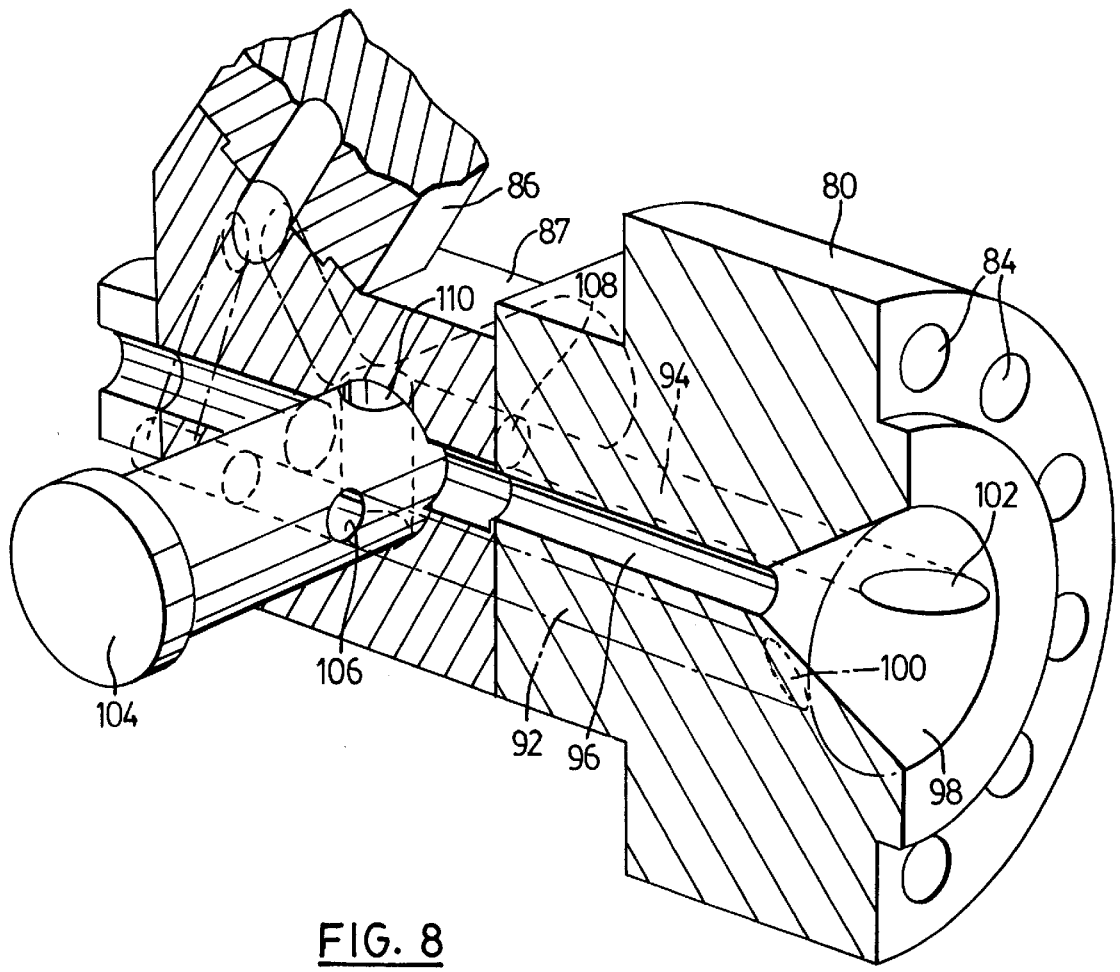
FIG. 8 is a perspective view, partly in section, of another embodiment of an injection molding machine of the invention.

FIG. 8 illustrates an embodiment of the invention in which shooting pot head 80 is secured to the forward end of a cylindrical injection barrel, not shown, by bolts passing through equipaced holes 84. Plasticizing unit 86, a portion of which is shown connected to flow regulating assembly 87, introduces molten plastic resin contained therein to a pair of diverging branch channels 92, 94 which turn to straddle injection channel 96. Injection channel 96 is coaxial with the injection barrel and with conical seat 98, terminating at wall opening 99 at the apex of seat 98. Branch channels 92, 94 terminate in wall openings 100, 102 in seat 98 on each side of wall opening 99 of channel 96.

Figure 11:
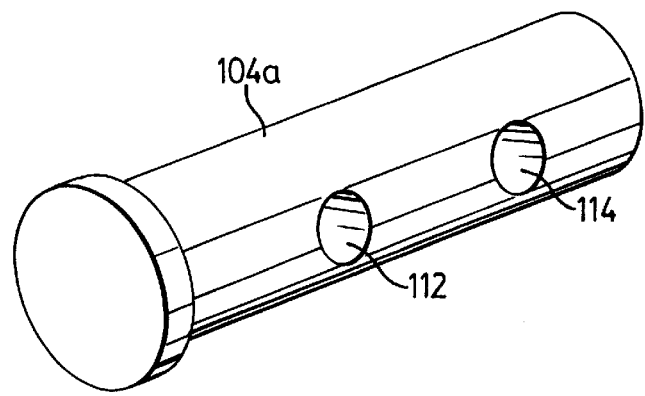
FIG. 11 is a perspective view of a reciprocal spool valve.

A rotary valve 104 has a pair of spaced apart, parallel diametric passages 106, 108 alignable with branch channels 92, 94 for ingress of molten plastic to wall openings 100, 102 when rotated to feed position shown in FIG. 8. Diametric passage 110 centered in valve 104 between passages 106, 108 perpendicular thereto is aligned with injection channel 96 by rotation of valve 104 through 90° for injection of molten resin from the accumulator cavity. Although a rotary valve 104 has been described, it will be understood that the valve may be an axially reciprocal valve 104a shown in FIG. 11 with a pair of diametric passages 112, 114 spaced apart a distance equal to the spacing of branch channels 92, 94. Alignment of passages 112, 114 with channels 92, 94 by axial movement of valve 104a permits ingress of molten plastic and axial movement of valve spool to the left or right as viewed in FIG. 8 to align either passage 112 or 114 with injection channel 96 permits ejection of molten resin.

Figure 9:
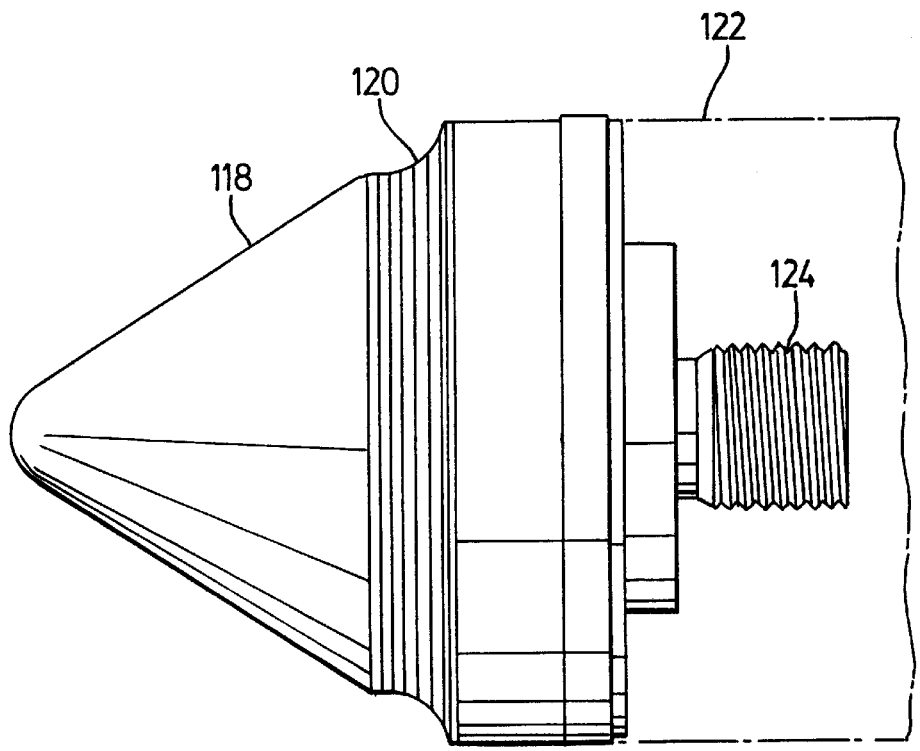
FIG. 9 is a perspective view of an embodiment of plunger tip of the invention.

FIG. 9 shows a conical plunger tip 118 with an annular concave recess 120 formed about the periphery thereof. Tip 118 is adapted to be removably attached to the forward end of injector barrel 122, shown by ghost lines, by a threaded male coupling 124.

Figure 10:
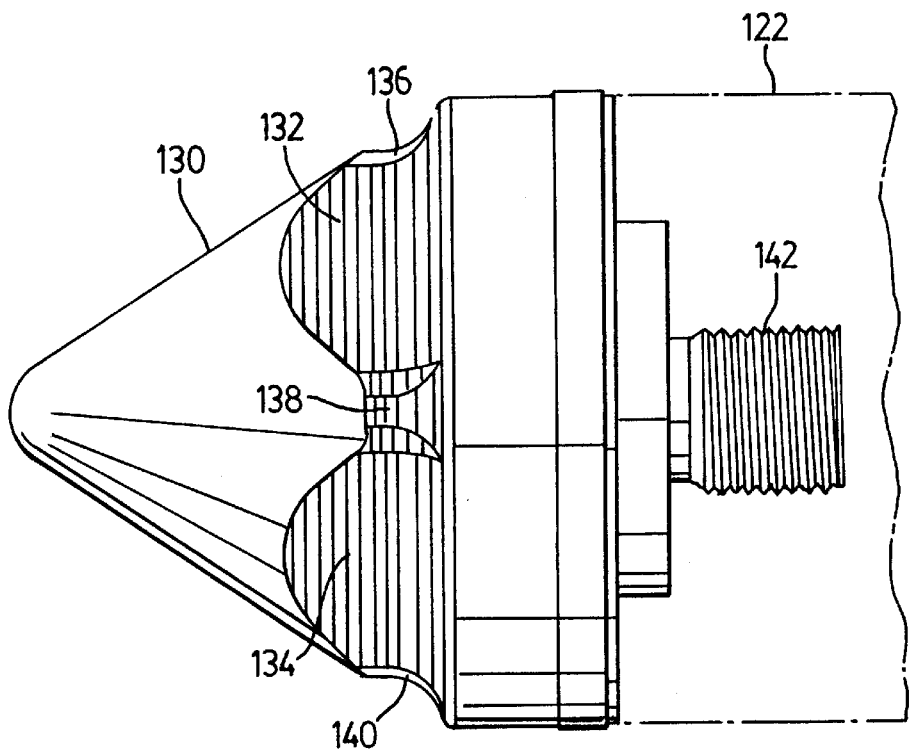
FIG. 10 is a perspective view of another embodiment of plunger tip of the invention.

FIG. 10 shows another embodiment of conical plunger tip 130 with the tip surface having four equispaced flat planes, two of which are shown at 132, 134, with four annular concave segments equispaced about the periphery thereof, three of which are shown as depicted by numerals 136, 138 and 140. Threaded male coupling 142 permits removable attachment to injector barrel 122, shown by ghost lines.

The peripheral recess 120 and the four recess segments about the two plunger tips 118 and 130 cause more turbulent flow for enhanced mixing of the fresh heated resin upon introduction into the accumulating cavity to the rear of resin retained from the preceding injection cycle, thereby further avoiding a stagnation zone.

It will be understood, of course, that modifications can be made in the embodiments of the invention illustrated and described herein without departing from the scope and purview of the invention as defined by the appended claims.

We claim:

1. A flow regulating and distributing assembly for controlling the flow of plastic material into an accumulator cavity of a barrel of an injection molding machine from a plasticizing chamber and for controlling the discharge of plastic material from the accumulator cavity to an injection nozzle, said injection molding machine having a shooting pot head with a conical seat connected to the barrel at the periphery of the conical seat, and said shooting pot head having a central injection channel coaxial with the conical seat communicating the accumulator cavity with the injection nozzle, said flow regulating and distributing assembly comprising:

a first channel formed therein for connecting the shooting pot head injection channel with the injection nozzle and a second channel for connecting the plasticizing chamber with the shooting pot head, said second channel having a plurality of branch channels having outlets in the conical seat in proximity to the periphery of the conical seat operative to feed said plastic material to the shooting pot head in proximity to the shooting pot head periphery, and valve means operative to feed said plastic material to the shooting pot head through the second channel while closing the first channel and to discharge said plastic material from the shooting pot head to the injection nozzle through the first channel while closing the second channel.

2. A flow regulating and distributing assembly as claimed in claim 1, said second channel having four branch channels having wall openings angularly equispaced about the conical seat in proximity to the periphery of the conical seat.

3. A flow regulating and distributing assembly as claimed in claim 1, said second channel having a pair of branch channels straddling the first channel above and below the first channel, said branch channels having wall openings in the conical seat above and below the first channel in proximity to the periphery of the conical seat.

4. A flow regulating and distributing assembly as claimed in claim 1, said second channel having a pair of branch channels straddling the first channel at each side of the first channel, said branch channels having wall openings in the conical seat at each side of the first channel in proximity to the periphery of the conical seat.

5. A flow regulating and distributing assembly as claimed in claim 1, wherein said first channel and said second channel intersect and wherein said valve means are mounted at the intersection of the first and second channels for rotary or axially reciprocal movement.

6. A flow regulating and distributing assembly as claimed in claim 5 in which said valve means comprises a rotary valve having one diametric passage which can be aligned for communication with either the first or second channels by selective rotary movement of the valve.

7. A flow regulating and distributing assembly as claimed in claim 3 in which said valve means comprises an axially reciprocal spool valve having a pair of axially spaced-apart diametric passages formed therein for communication with either the first channel or the second branch channels by selective axial movement of the valve.

8. A flow regulating and distributing assembly as claimed in claim 3 in which said valve means comprises an axially reciprocal valve having a pair of axially spaced-apart perpendicular diametric passages formed therein for communication with either the first or second channels by selective axial movement of the valve.

9. A flow regulating and distributing assembly as claimed in claim 1, additionally comprising a shooting pot plunger having a conical tip adapted to mate with the conical seat, said conical tip having an annular concave recess opposed to the periphery of the conical seat.

10. A flow regulating and distributing assembly as claimed in claim 1, additionally comprising a shooting pot plunger having a conical tip adapted to mate with the conical seat, said conical tip having an annular concave recess opposed to the periphery of the conical seat and having a plurality of equispaced flat planes about the perimeter thereof intersecting the annular concave recess to form a plurality of peripheral concave segments.

11. A flow regulating and distributing assembly in an injection mold for controlling the flow of plastic material into the reservoir of a shooting pot in a mold from a melt channel, said shooting pot head having a conical seat forming part of an accumulator cavity at the periphery thereof, and for controlling the discharge of plastic material through a melt channel to an injection nozzle passage, said injection mold comprising:

a first channel formed therein for connecting the shooting pot head injection channel with the injection nozzle and a second channel for connecting the melt channel with the shooting pot head conical seat in proximity to the periphery of the conical seat, said second channel having a plurality of branch channels having outlets in the conical seat in proximity to the periphery of the conical seat operative to feed said plastic material to the shooting pot head in proximity to the shooting pot head periphery, and first and second valve means, said first valve means operative to feed said plastic material to the shooting pot head through the second channel while the second valve means are closed, and said second valve means operative to discharge said plastic material from the shooting pot head to the injection nozzle passage through the first channel while the first valve means are closed.

12. A flow regulating and distributing assembly as claimed in claim 11, said second channel having a plurality of branch channels having outlets in the conical seat in proximity to the periphery of the conical seat.

13. A flow regulating and distributing assembly as claimed in claim 11, said second channel having a pair of branch channels straddling the first channel above and below the first channel, said branch channels having wall openings in the conical seat above and below the first channel in proximity to the periphery of the conical seat.

14. A flow regulating and distributing assembly as claimed in claim 11, said second channel having a pair of branch channels straddling the first channel at each side of the first channel, said branch channels having wall openings in the conical seat at each side of the first channel in proximity to the periphery of the conical seat.

* * * * *